(12) United States Patent
Rittweger et al.

(10) Patent No.: US 12,172,472 B2
(45) Date of Patent: Dec. 24, 2024

(54) PNEUMATIC TIRE FOR A VEHICLE

(71) Applicant: Continental Reifen Deutschland GmbH, Hannover (DE)

(72) Inventors: Stefan Rittweger, Garbsen (DE); Juraj Jurco, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 386 days.

(21) Appl. No.: 17/595,698

(22) PCT Filed: Apr. 8, 2020

(86) PCT No.: PCT/EP2020/059956
§ 371 (c)(1),
(2) Date: Mar. 31, 2022

(87) PCT Pub. No.: WO2020/239305
PCT Pub. Date: Dec. 3, 2020

(65) Prior Publication Data
US 2022/0274446 A1  Sep. 1, 2022

(30) Foreign Application Priority Data
May 29, 2019 (DE) ...................... 10 2019 207 908.3

(51) Int. Cl.
*B60C 13/00* (2006.01)

(52) U.S. Cl.
CPC .................. *B60C 13/001* (2013.01)

(58) Field of Classification Search
CPC ..... B60C 13/001; B60C 13/02; B60C 13/023; B60C 13/00
See application file for complete search history.

(56) References Cited

U.S. PATENT DOCUMENTS

| | | |
|---|---|---|
| 2009/0008015 A1 | 1/2009 | Itoi |
| 2012/0227879 A1 | 9/2012 | Muhlhoff et al. |
| 2014/0166177 A1 | 6/2014 | Muhlhoff et al. |
| 2015/0004335 A1 | 1/2015 | Parr et al. |

(Continued)

FOREIGN PATENT DOCUMENTS

| | | |
|---|---|---|
| CN | 101142097 A | 3/2008 |
| DE | 102013223567 A1 | 4/2015 |

(Continued)

OTHER PUBLICATIONS

International Search Report dated Jun. 25, 2020 of International Application PCT/EP2020/059956 on which this application is based.

(Continued)

*Primary Examiner* — Justin R Fischer
(74) *Attorney, Agent, or Firm* — Gregory Adams; Richard Wolf

(57) ABSTRACT

The invention relates to a pneumatic tire for a vehicle, having formed on its outer surface at least one surface element (2) with a contrast structure (6) which imparts a roughness to the surface element (3).
In the case of a tire of said type, it is the intention to make available a contrast structure with a considerably improved contrast effect.
This is achieved in that the contrast structure (6) is a large-area, nonuniform hill-and-dale contrast structure (6) having an areal roughness value $S_a$ according to EN ISO 25178 of 50 µm to 150 µm.

10 Claims, 1 Drawing Sheet

(56) References Cited

U.S. PATENT DOCUMENTS

Figure 1:
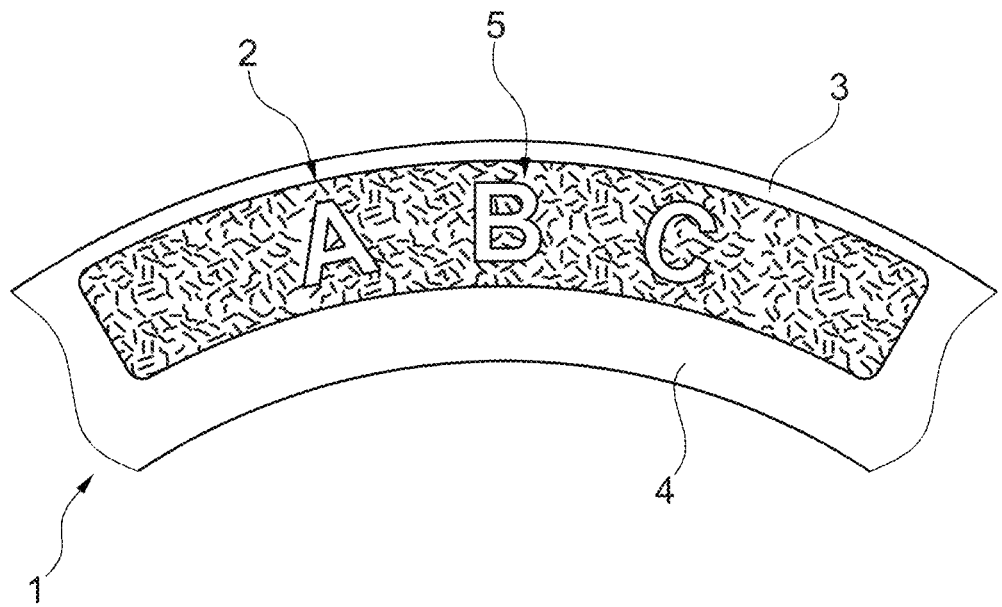

| | | |
|---|---|---|
| 2015/0246587 A1 | 9/2015 | Muhlhoff et al. |
| 2016/0137008 A1 | 5/2016 | Emorine et al. |
| 2016/0152095 A1 | 6/2016 | Berger et al. |
| 2016/0185163 A1 | 6/2016 | Muhlhoff et al. |
| 2016/0185169 A1 | 6/2016 | Strand |
| 2016/0197008 A1 | 7/2016 | Yokokawa et al. |
| 2021/0016608 A1 | 1/2021 | Rittweger |

FOREIGN PATENT DOCUMENTS

| | | |
|---|---|---|
| DE | 202014010855 U1 | 1/2017 |
| DE | 102018204245 A1 | 9/2019 |
| EP | 2554401 A1 | 2/2013 |
| WO | 2014040967 A1 | 3/2014 |
| WO | 2016005569 A1 | 1/2016 |

OTHER PUBLICATIONS

EP Office action dated Apr. 13, 2023 of counterpart EP application 20 720 372.0.
CN Office action dated Dec. 1, 2022 of counterpart CN application 2020800400402.

PNEUMATIC TIRE FOR A VEHICLE

The invention relates to a pneumatic tire for a vehicle having formed on its outer surface at least one surface element with a contrast structure which imparts a roughness to the surface element.

It is known that surface elements having a contrast structure can be formed on the outer surface of pneumatic tires for vehicles, in particular on side walls, said surface elements primarily having the task of creating a contrast with other surface regions of the side walls, in particular unstructured surface regions thereof, in order in this way, for example, to make it easier to distinguish symbols on the side walls, e.g. design elements or logos. Surface elements having contrast structures make this possible since—in comparison with smooth surfaces—they reflect less light, that is to say "capture" incident light and therefore appear darker to the observer than smooth surface regions.

A pneumatic tire of the type stated at the outset for a vehicle is known from US 2012/0227879 A1, for example. At least one surface element having a contrast structure consisting of a multiplicity of, for example, conical elevations is formed on the outer surface of the pneumatic tire for a vehicle. The conical elevations have a mean diameter of 0.03 mm to 0.5 mm, wherein at least five, preferably at least fifteen, elevations are formed per square millimeter. The mean peak-to-valley height $R_z$ of the contrast structure, determined in accordance with DIN 4768, which has since been withdrawn, is 5 µm to 30 µm. To form such elevations on the tire, the corresponding mold component of the vulcanization mold that vulcanizes the tire is provided with depressions by means of laser engraving.

US 2016/0152095 A1, US 2016/0185163 A1 and US 2016/0137008 A1 are each concerned with a pneumatic tire for a vehicle which has, on at least one of its side walls, a surface element having a contrast structure. The contrast structure is formed, for example, by elevations of conical configuration which are situated in a depression formed in the side wall and have a mean cross-sectional area of 0.0007 mm² to 0.06 mm².

The previously known contrast structures are of largely regular configuration, as a result of which the contrast effect thereof is limited.

The invention addresses the problem of making available a contrast structure with a significantly improved contrast effect on tires.

According to the invention, the problem addressed is solved by virtue of the fact that the contrast structure is a large-area, nonuniform hill-and-dale contrast structure having an areal roughness value $S_a$ according to EN ISO 25178 of 50 µm to 150 µm.

In contrast to the known contrast structures formed from individual elevations of substantially identical configuration, such a hill-and-dale contrast structure is distinguished by hills and dales which are "continuous" or merge into one another, reach different heights (hills) and are on different levels (dales), and also has ridges and saddles. Here, the hill-and-dale contrast structure is distinguished, in particular, by a multiplicity of intersections, at which a plurality of hill structures or a plurality of dale structures converge. As a result, the "negative" of the contrast structure in the vulcanization mold is very stable, can be vented effectively during the introduction of the green tire into the mold, and can be formed flawlessly on the tire. Owing to its nonuniformity and significantly greater roughness in comparison with the known contrast structures, the hill-and-dale contrast structure according to the invention captures light in an optimum manner, and therefore its contrast effect with smooth surface regions is significantly better. In addition, the irregular hill-and-dale contrast structure is also particularly robust in relation to any contaminants remaining in the corresponding mold component of the vulcanization mold or to any slight damage which occurs there.

According to a preferred variant embodiment, the areal roughness value $S_a$ according to EN ISO 25178 of the nonuniform hill-and-dale contrast structure is 70 µm to 120 µm. Such a rough hill-and-dale contrast structure is, on the one hand, particularly robust and, on the other hand, makes possible a very good contrast effect with smooth surface regions.

Further preferred variant embodiments which relate to the height profile of the hill-and-dale contrast structure contribute to a further improvement of the contrast effect.

In this context, it is advantageous if, with each height surface which extends parallel to the base level of the hill-and-dale contrast structure, lies at a height of 50 µm relative to said base level, and has an area of 1 mm×1 mm, the nonuniform hill-and-dale contrast structure forms an intersection area which occupies 80% to 90% of the area of the height surface.

It is furthermore advantageous in this context if, with each height surface which extends parallel to the base level of the hill-and-dale contrast structure, lies at a height of 100 µm relative to the base level, and has an area of 1 mm×1 mm, the nonuniform hill-and-dale contrast structure forms an intersection area which occupies 40% to 60% of the area of the height surface.

Moreover, it is advantageous in this context if, with each height surface which extends parallel to the base level of the hill-and-dale contrast structure, lies at a height of 200 µm relative to the base level, and has an area of 1 mm×1 mm, the nonuniform hill-and-dale contrast structure forms an intersection area which occupies 20% to 40% of the area of the height surface.

It is furthermore particularly advantageous if the nonuniform hill-and-dale contrast structure has peak regions which adjoin height surfaces which extend parallel to the base level of the hill-and-dale contrast structure, lie at a height of 400 µm relative to the base level, and have an area of 1 mm×1 mm, wherein the nonuniform hill-and-dale contrast structure has up to five, in particular up to three, peak regions within each of these height surfaces.

According to another preferred variant embodiment, the hill-and-dale contrast structure has a height of 400 µm to 500 µm relative to the base level at its highest point(s). As a result, the hill-and-dale contrast structure captures a particularly large amount of light and its contrast effect with smooth surface regions is further improved.

In a preferred embodiment, the surface element having the nonuniform hill-and-dale contrast structure is formed on a side wall of the pneumatic tire for a vehicle.

According to another preferred variant, the surface element having the nonuniform hill-and-dale contrast structure is formed on the tread, preferably also on the outer surface coming into contact with the ground, of the pneumatic tire for a vehicle. To achieve special light/dark effects, the nonuniform hill-and-dale contrast structure can be formed on groove flanks and/or groove bases of grooves extending in the tread. It is also possible for surface elements having the nonuniform hill-and-dale contrast structure to be formed on the tire shoulder flanks running to the side walls.

Here, the surface element having the nonuniform hill-and-dale contrast structure preferably forms a design element, lettering or a character or surrounds such a feature.

Figure 2:
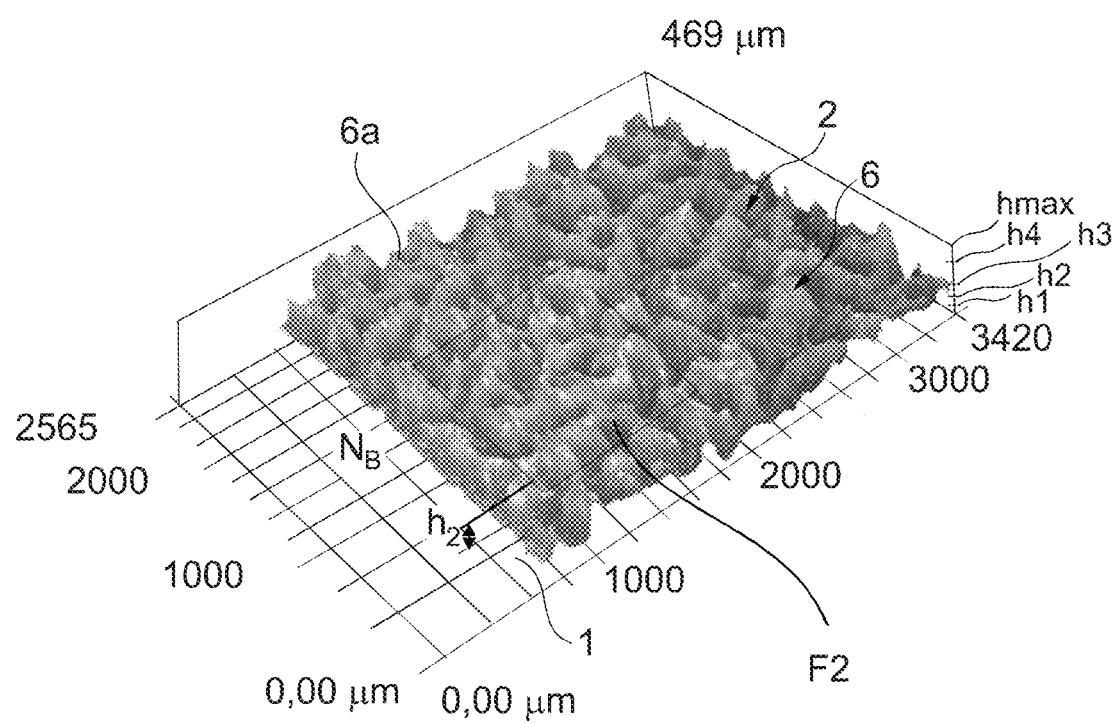

Further features, advantages and details of the invention will now be described in more detail with reference to the drawing, which schematically shows an exemplary embodiment of the invention. In the drawing:

FIG. 1 shows a circumferential segment of a side wall of a pneumatic tire for a vehicle in plan view, featuring one variant embodiment of the invention, and FIG. 2 shows a micrograph in the region of a surface element situated on the side wall.

In all the illustrations shown in the figures, the curvature of the side wall has been ignored.

The invention is concerned with surface elements which are formed on the outer surface of pneumatic tires for vehicles and have a special contrast structure.

In this context, the surface elements are formed, for example, on a region of the outer surface which does not come into contact, or not in full surface contact, with the ground during the use of the pneumatic tire for a vehicle. As a particular preference, the surface elements are formed on a side wall of the pneumatic tire for a vehicle. Side walls of pneumatic tires for vehicles generally include characters which represent the prescribed information, such as dimensional information, the speed index, the manufacturer, the purpose (summer/winter tires), or other characters, such as logos or design elements. Surface elements having a contrast structure can surround the characters mentioned on the side wall or can themselves form the characters. For example, a surface element of this kind is a logo formed in the contrast structure or, alternatively, the surface of the logo itself is smooth and the logo is surrounded by a contrast structure.

It is furthermore also possible, in particular, for the surface elements to be applied to groove flanks and/or groove bases of grooves extending in the tread, or to the edge of the tread, i.e. to the shoulder flanks extending to the side walls, outside the ground contact surface, or to the outer surface of the tread, i.e. to a running surface that comes into contact with the ground.

The level with respect to which the contrast structure is formed on the finished tire is referred to below as the base level $N_B$. The base level $N_B$ can be formed, for example, by part of the outer surface of the pneumatic tire for a vehicle, in particular the side wall or a base of a shallow depression formed on the side wall.

The contrast structure can be formed in the course of vulcanization on the outer surface of the pneumatic tire for a vehicle. The mold segment(s) of the vulcanization mold, e.g. the side wall shells, is/are provided with corresponding shallow depressions, which are created by means of laser engraving. Such a contrast structure is therefore a positive in relation to the respective base level. Alternatively, the contrast structure can also be engraved by laser on the already fully vulcanized tire, and therefore this represents a negative in relation to the respective base level.

FIG. 1 shows a schematic illustration, projected into the plane, of a circumferential segment of a side wall 1 having a surface element 2 which has substantially the shape of a segment of a circular ring. A tread edge 3 and an outer bead region 4, which are at least partially covered by a rim when the tire is mounted on the rim are additionally indicated in FIG. 1. The surface element 2 surrounds lettering 5, the letters A B C of which have a smooth surface. The lettering 5 is thus not part of the surface element 2.

FIG. 2 shows a micrograph of a partial region at the edge of the surface element 2, additionally indicating the base level $N_B$, which corresponds in the exemplary embodiment shown to the level of the side wall 1. As the dimensions show, the micrograph covers an area of about 2500 µm×2500 µm of the surface element 2. The surface element 2 is provided over the full area (see FIG. 1), i.e. over its entire extent, with a nonuniform hill-and-dale contrast structure 6, which imparts roughness, i.e. unevenness, to the surface element 2. The hill-and-dale contrast structure 6 has an areal roughness value $S_a$ in accordance with EN ISO 25178 of 50 µm to 150 µm, in particular of 70 µm to 120 µm. Here, as is known, the areal roughness value $S_a$ is an areal arithmetic mean, in this case an arithmetic mean based on the area of the hill-and-dale contrast structure 6.

The hill-and-dale contrast structure 6 is formed by a multiplicity of hill structures which are situated at different levels and have ridges and saddles and of dale structures. The hill-and-dale contrast structure 6 is therefore made up of a multiplicity of hills of different heights and of a multiplicity of dales at different levels.

The shape of the hill-and-dale contrast structure 6 is considered below at height surfaces $F_1$, $F_2$, $F_3$ and $F_4$ and explained in greater detail with reference to these. The height surfaces $F_1$, $F_2$, $F_3$ and $F_4$ extend parallel to the respective base level $N_B$, have an area of 1 mm×1 mm and intersect the hill-and-dale contrast structure 6 at various heights $h_1$ (height surface $F_1$), $h_2$ (height surface $F_2$), $h_3$ (height surface $F_3$) and $h_4$ (height surface $F_4$) determined in relation to the base level $N_B$. In this case, the height surfaces $F_1$, $F_2$, $F_3$ and $F_4$ extend exclusively in the region of the hill-and-dale contrast structure 6 and therefore do not project laterally beyond the latter. Each height surface $F_1$, $F_2$, $F_3$ and $F_4$ therefore has one or more surface region(s) in which the hill-and-dale contrast structure 6 projects through the height surface $F_1$, $F_2$, $F_3$ and $F_4$. This or these surface region(s) forms or form a single-part or multi-part intersection area which is a constituent part of the respective height surface $F_1$, $F_2$, $F_3$ and $F_4$. The heights $h_1$, $h_2$, $h_3$, $h_4$ and, by way of example, one height surface $F_2$ have been entered in FIG. 2. Height surfaces $F_1$, $F_3$ and $F_4$ have not been depicted for reasons of clarity. Height $h_1$ is 50 µm, height $h_2$ is 100 µm, height $h_3$ is 200 µm, height $h_4$ is 400 µm.

The intersection area of the hill-and-dale contrast structure 6 with each height surface $F_1$ preferably occupies 80% to 90% of the area of the respective height surface $F_1$. The intersection area of the hill-and-dale contrast structure 6 with each height surface $F_2$ occupies 40% to 60% of the area of the respective height surface $F_2$. The intersection area of the hill-and-dale contrast structure 6 with each height surface $F_3$ occupies 20% to 40% of the area of the respective height surfaces $F_3$. The height surfaces $F_4$ divide peak regions 6a from the rest of the hill-and-dale contrast structure 6. A peak region 6a is a continuous region of the hill-and-dale contrast structure 6 which "sits on" or adjoins a height surface $F_4$. Within each height surface $F_4$ there are preferably up to five, in particular up to three, peak regions 6a.

Furthermore, the hill-and-dale contrast structure 6 preferably has a height $h_{max}$ of 400 µm to 500 µm in relation to the base level $N_B$ at its highest point(s).

The invention is not limited to the embodiment variant described.

LIST OF REFERENCE SIGNS

1 . . . Side wall
2 . . . Surface element
3 . . . Edge of the tread
4 . . . Bead region
5 . . . Lettering
6 . . . Hill-and-dale contrast structure 6a Peak region
$F_1, F_2, F_3, F_4$ Height surface
$h_1, h_2, h_3, h_4, h_{max}$ Height
$N_B$ Base level

The invention claimed is:

1. A pneumatic tire for a vehicle, comprising on its outer surface at least one surface element with a contrast structure which imparts a roughness to the surface element;
wherein the contrast structure is a large-area, nonuniform hill-and-dale contrast structure having an areal roughness value Sa according to EN ISO 25178 of 50 μm to 150 μm; and,
wherein with each height surface ($F_1$) which extends parallel to the base level ($N_B$) of the nonuniform hill-and-dale contrast structure, lies at a height ($h_1$) of 50 μm relative to the base level ($N_B$), and has an area of 1 mm×1 mm, the nonuniform hill-and-dale contrast structure forms an intersection area which occupies from 80% to 90% of the area of the height surface ($F_1$).

2. The pneumatic tire for a vehicle as claimed in claim 1, wherein the areal roughness value Sa according to EN ISO 25178 of the nonuniform hill-and-dale contrast structure is 70 μm to 120 μm.

3. The pneumatic tire for a vehicle as claimed in claim 1, wherein with each height surface ($F_2$) which extends parallel to the base level ($N_B$) of the nonuniform hill-and-dale contrast structure, lies at a height ($h_2$) of 100 μm relative to the base level ($N_B$), and has an area of 1 mm×1 mm, the nonuniform hill-and-dale contrast structure forms an intersection area which occupies 40% to 60% of the area of the height surface ($F_2$).

4. The pneumatic tire for a vehicle as claimed in claim 1, wherein with each height surface ($F_3$) which extends parallel to the base level ($N_B$) of the nonuniform hill-and-dale contrast structure, lies at a height ($h_3$) of 200 μm relative to the base level ($N_B$), and has an area of 1 mm×1 mm, the nonuniform hill-and-dale contrast structure forms an intersection area which occupies 20% to 40% of the area of the height surface ($F_3$).

5. The pneumatic tire for a vehicle as claimed in claim 1, wherein the nonuniform hill-and-dale contrast structure has peak regions which adjoin height surfaces ($F_4$) which extend parallel to the base level ($N_B$) of the nonuniform hill-and-dale contrast structure, lie at a height ($h_4$) of 400 μm relative to the base level ($N_B$), and have an area of 1 mm×1 mm, wherein the nonuniform hill-and-dale contrast structure has up to five of the peak regions within each of these height surfaces ($F_4$).

6. The pneumatic tire for a vehicle as claimed in claim 1, wherein the nonuniform hill-and-dale contrast structure has a height ($h_{max}$) of 400 μm to 500 μm relative to the base level ($N_B$) at highest point(s) of the nonuniform hill-and-dale contrast structure.

7. The pneumatic tire for a vehicle as claimed in claim 1, wherein the at least one surface element having the nonuniform hill-and-dale contrast structure is formed on a side wall of the pneumatic tire for a vehicle.

8. The pneumatic tire for a vehicle as claimed in claim 1 further comprising a profiled tread, wherein the at least one surface element having the nonuniform hill-and-dale contrast structure is formed on the tread, in particular on an outer surface of the tread coming into contact with the ground and/or on groove flanks and/or on groove bases of grooves extending into the tread.

9. The pneumatic tire for a vehicle as claimed in claim 1, wherein the at least one surface element having the nonuniform hill-and-dale contrast structure is formed on tire shoulder flanks running to side walls of the pneumatic tire for a vehicle.

10. The pneumatic tire for a vehicle as claimed in claims 1, where the at least one surface element having the nonuniform hill-and-dale contrast structure forms a design element, a lettering or a character, or surrounds the design element, the lettering or the character.

\* \* \* \* \*